United States Patent
Sippel et al.

(10) Patent No.: US 10,309,257 B2
(45) Date of Patent: Jun. 4, 2019

(54) TURBINE ASSEMBLY WITH LOAD PADS

(71) Applicants: Rolls-Royce Corporation, Indianapolis, IN (US); Rolls-Royce North American Technologies, Inc., Indianapolis, IN (US)

(72) Inventors: Aaron D. Sippel, Zionsville, IN (US); Ted J. Freeman, Danville, IN (US); David J. Thomas, Brownsburg, IN (US); Richard C. Uskert, Timonium, MD (US); Peter J. Loftus, Greenwood, IN (US); Andrew J. Lazur, Huntington Beach, CA (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 643 days.

(21) Appl. No.: 15/055,004

(22) Filed: Feb. 26, 2016

(65) Prior Publication Data
US 2016/0258304 A1 Sep. 8, 2016

Related U.S. Application Data

(60) Provisional application No. 62/126,951, filed on Mar. 2, 2015.

(51) Int. Cl.
*F01D 25/24* (2006.01)

(52) U.S. Cl.
CPC .... *F01D 25/246* (2013.01); *F05D 2300/6033* (2013.01); *Y02T 50/672* (2013.01)

(58) Field of Classification Search
CPC ........ F01D 11/12; F01D 11/18; F01D 25/246; F05D 2240/11
See application file for complete search history.

(56) References Cited

U.S. PATENT DOCUMENTS

| | | | |
|---|---|---|---|
| 2,667,327 A | 1/1954 | Hardigg | |
| 3,045,329 A | 7/1962 | Carli et al. | |
| 3,858,290 A | 1/1975 | Albani | |
| 4,087,199 A | 5/1978 | Hemsworth et al. | |
| 5,630,700 A | 5/1997 | Olsen et al. | |
| 5,820,337 A | 10/1998 | Robert et al. | |
| 6,315,519 B1 * | 11/2001 | Bagepalli | F01D 11/08 415/135 |
| 6,514,046 B1 | 2/2003 | Morrison et al. | |
| 6,610,385 B2 | 8/2003 | Cairo | |
| 6,652,228 B2 | 11/2003 | Tiemann | |
| 7,083,388 B2 | 8/2006 | Parisi et al. | |
| 7,247,002 B2 | 7/2007 | Albrecht et al. | |

(Continued)

FOREIGN PATENT DOCUMENTS

| | | |
|---|---|---|
| DE | 2639200 A1 | 3/1978 |
| EP | 2511480 A2 | 10/2012 |

(Continued)

*Primary Examiner* — Justin D Seabe
*Assistant Examiner* — Juan G Flores
(74) *Attorney, Agent, or Firm* — Barnes & Thornburg LLP

(57) ABSTRACT

A turbine shroud for a gas turbine engine includes a carrier and a blade track segment. The carrier is formed to include an inwardly opening blade track channel and the blade track segment is positioned in the blade track channel to couple the blade track segment with the carrier.

14 Claims, 5 Drawing Sheets

(56) References Cited

U.S. PATENT DOCUMENTS

| | | |
|---|---|---|
| 7,247,022 B2 | 7/2007 | Allred et al. |
| 7,278,820 B2 | 10/2007 | Keller |
| 7,410,342 B2 | 8/2008 | Matheny |
| 7,494,317 B2 | 2/2009 | Keller et al. |
| 7,526,862 B2 | 5/2009 | Leveque et al. |
| 7,600,978 B2 | 10/2009 | Vance et al. |
| 7,670,116 B1 | 3/2010 | Wilson, Jr. et al. |
| 7,824,150 B1 | 11/2010 | Kimmel et al. |
| 7,950,234 B2 | 5/2011 | Radonovich et al. |
| 8,061,977 B2 | 11/2011 | Keller et al. |
| 8,562,294 B2 | 10/2013 | Gouda et al. |
| 8,740,552 B2 | 6/2014 | Marusko et al. |
| 9,062,553 B2 | 6/2015 | Baumas et al. |
| 9,121,301 B2 * | 9/2015 | Floyd .................. F01D 11/18 |
| 2003/0031555 A1 | 2/2003 | Noe et al. |
| 2006/0034679 A1 | 2/2006 | Harding et al. |
| 2009/0232644 A1 | 9/2009 | Greene et al. |
| 2010/0021290 A1 | 1/2010 | Schaff et al. |
| 2010/0080707 A1 | 4/2010 | Tholen |
| 2010/0166565 A1 | 7/2010 | Uskert et al. |
| 2011/0293410 A1 | 12/2011 | Marusko et al. |
| 2012/0156029 A1 | 6/2012 | Karafillis et al. |
| 2013/0251515 A1 * | 9/2013 | Floyd .................. F01D 11/18 |
| | | 415/200 |
| 2014/0234117 A1 | 8/2014 | Cario et al. |
| 2015/0016956 A1 | 1/2015 | Uskert et al. |

FOREIGN PATENT DOCUMENTS

| | | |
|---|---|---|
| FR | 2951494 A1 | 4/2011 |
| GB | 836030 A | 6/1960 |

\* cited by examiner

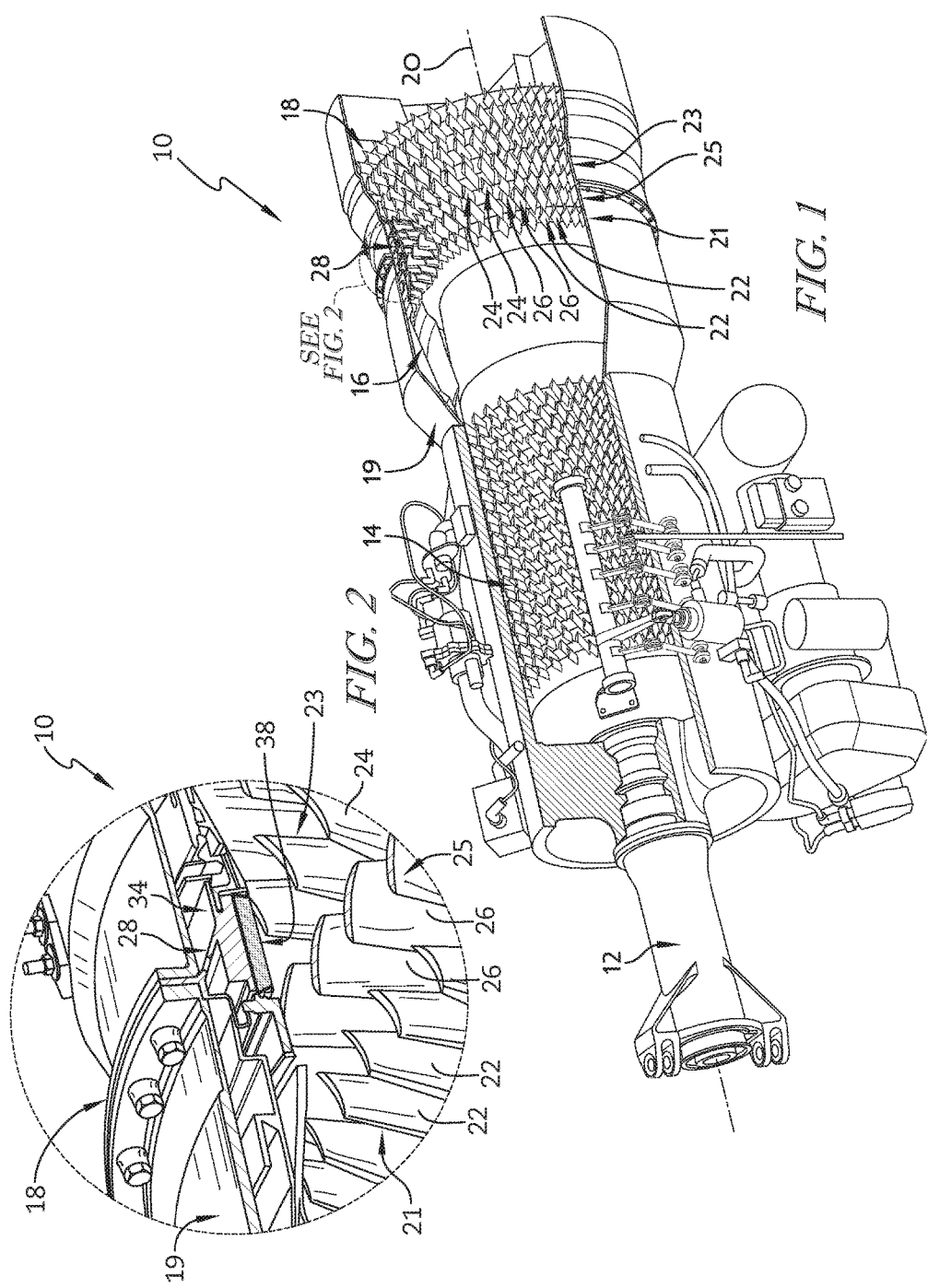

TURBINE ASSEMBLY WITH LOAD PADS

CROSS REFERENCE TO RELATED APPLICATIONS

This application claims priority to and the benefit of U.S. Provisional Patent Application No. 62/126,951, filed 2 Mar. 2015, the disclosure of which is now expressly incorporated herein by reference.

FIELD OF THE DISCLOSURE

The present disclosure relates generally to gas turbine engines, and more specifically to load pads for transmitting loads in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some instances, coupling such components presents design challenges.

SUMMARY

The present disclosure may comprise one or more of the following features and combinations thereof.

According to an aspect of the present disclosure, a turbine shroud may include a metallic carrier, a ceramic blade track segment, and a plurality of load pads. The metallic carrier may be arranged around a central axis. The metallic carrier may be formed to include a radially-inwardly opening blade track channel defined by a fore-retainer surface, an aft-retainer surface spaced apart axially from the fore-retainer surface, and an intermediate surface extending between the fore and aft-retainer surfaces.

The ceramic blade track segment may include a runner and an attachment body extending radially outward away from the runner and positioned in the blade track channel to couple the ceramic blade track segment with the metallic carrier. The attachment body may include a fore-attachment surface that faces the fore-retainer surface, an aft-attachment surface that faces the aft-retainer surface, and an outer surface that faces the intermediate surface.

The plurality of load pads may be positioned in the blade track channel. The load pads may be positioned radially inward of the outer surface included in the attachment body between the fore-retainer surface and the fore-attachment surface and between the aft-retainer surface and the aft-attachment surface. The load pads may transmit loads between the metallic carrier and the ceramic blade track segment at predetermined locations on the fore and aft-attachment surfaces while allowing growth of the metallic carrier and the ceramic blade track segment at different rates during use of the turbine shroud.

In some embodiments, each load pad may include an outer pad surface, an inner pad surface, and at least two ramped surfaces. The outer pad surface may be arranged to engage the metallic carrier. The inner pad surface may be spaced apart from the outer pad surface and arranged to engage the ceramic blade track segment. The at least two ramped surfaces may each extend away from the inner pad surface at an angle relative to the inner pad surface toward the outer pad surface.

In some embodiments, the fore-retainer surface of the metallic carrier may be formed to include a pad recess that extends into the fore-retainer surface and receives a portion of a load pad. In some embodiments, the fore-attachment surface may be spaced apart from the fore-retainer surface and the load pad received in the pad recess may extend beyond the pad recess into the blade track channel and engages the for-attachment surface.

In some embodiments, the aft-retainer surface of the metallic carrier may be formed to include a pad recess. The pad recess may extend into the aft-retainer surface to receive a portion of a load pad.

In some embodiments, one of the plurality of load pads may include an outer pad surface and an inner pad surface. The outer pad surface may be positioned in the pad recess and engaged with the aft-retainer surface. The inner pad surface may be spaced apart from the outer pad surface and positioned in the blade track channel and engaged with the aft-attachment surface.

In some embodiments, the aft-retainer surface may be formed to include a first pad recess and a second pad recess spaced apart circumferentially from the first pad recess. The fore-retainer surface may be formed to include a third pad recess located circumferentially about midway between the first and second pad recesses.

In some embodiments, a load pad may be positioned in each of the first, second, and third pad recesses. Each load pad may be coupled with the metallic carrier by an adhesive to block the load pads from moving out of the first, second, and third pad recesses.

In some embodiments, the predetermined locations on the fore and aft-attachment surfaces may be high strength areas of the ceramic blade track segment positioned away from an edge of the ceramic blade track segment. In some embodiments, the load pads may be positioned in the predetermined locations on the fore and aft-attachment surfaces to locate peak mechanical loads in a different region than peak thermal loads acting on the ceramic blade track segment.

In some embodiments, the fore-attachment surface may be spaced apart from the fore-retainer surface. The aft-attachment surface may be spaced apart from the aft-retainer surface. In some embodiments, the load pads may comprise a nickel alloy.

According to another aspect of the present disclosure, a method of assembling a turbine shroud for use in an engine may include a number of steps. The method may include positioning load pads along a sidewall included in a blade track channel of a metallic carrier and moving an attachment body of a ceramic blade track segment relative to the metallic carrier and into the blade track channel to cause the load pads to engage the attachment body and transmit loads between the metallic carrier and the ceramic blade track segment through predetermined locations on the attachment body while allowing growth of the metallic carrier and the ceramic blade track segment at different rates during engine operation.

In some embodiments, the load pads may include an outer pad surface, an inner pad surface, and at least two ramped surfaces. The outer pad surface may be engaged with the metallic carrier. The inner pad surface may be spaced apart from the outer pad surface and arranged to engage the ceramic blade track segment. The at least two ramped surfaces may extend away from the inner pad surface toward the outer pad surface and the inner pad surface.

In some embodiments, the metallic carrier may include a radially extending fore-retainer sidewall and a radially extending aft-retainer sidewall that is spaced apart axially from the fore-retainer sidewall. The aft-retainer sidewall may be formed to include a first pad recess and a second pad recess spaced apart circumferentially from the first pad recess. The fore-retainer sidewall may be formed to include a third pad recess located circumferentially about midway between the first and second pad recesses.

In some embodiments, the method may further include coupling the outer pad surface to the metallic carrier with an adhesive. In some embodiments, the method may further include moving the attachment body of the ceramic blade track segment relative to the metallic carrier and out of the blade track channel and disposing of the load pads.

According to another aspect of the present disclosure, a method of assembly a turbine shroud may include a number of steps. The method may include providing a metallic carrier that is formed to include an inwardly-opening blade track channel and a radially extending retainer surface that forms a portion of the inwardly-opening blade track channel and a ceramic blade track segment that includes a radially extending attachment surface arranged to face the retainer surface, determining a first set of three-dimensional coordinates of a first desired load location on the radially extending retainer surface of the metallic carrier relative to a reference point, determining a second set of three-dimensional coordinates of a second desired load location on the radially extending attachment surface of the ceramic blade track segment relative to the reference point, and determining a three-dimensional size of a load pad based on the first and second set of three-dimensional coordinates.

In some embodiments, determining the three-dimensional size of the load pad may be based on the difference between the second and first set of three-dimensional coordinates. In some embodiments, the method may further include aligning the radially extending attachment surface with the radially extending retainer surface and moving the ceramic blade track segment relative to the metallic carrier to cause the ceramic blade track segment to be received in the blade track channel and cause the radially extending attachment surface to be engaged by the load pad at the second desired load location.

These and other features of the present disclosure will become more apparent from the following description of the illustrative embodiments.

BRIEF DESCRIPTION OF THE DRAWINGS

FIG. 1 is a cut-away perspective view of a gas turbine engine including a turbine section that includes a rotating wheel assembly and a turbine shroud arranged around the rotating wheel assembly;

FIG. 2 is a detail perspective view of the gas turbine engine of FIG. 1 showing that the turbine shroud includes a carrier and a segmented blade track positioned radially between the carrier and blades of the rotating wheel assembly to block combustion products from passing over the blades;

DETAILED DESCRIPTION OF THE DRAWINGS

Figure 3:
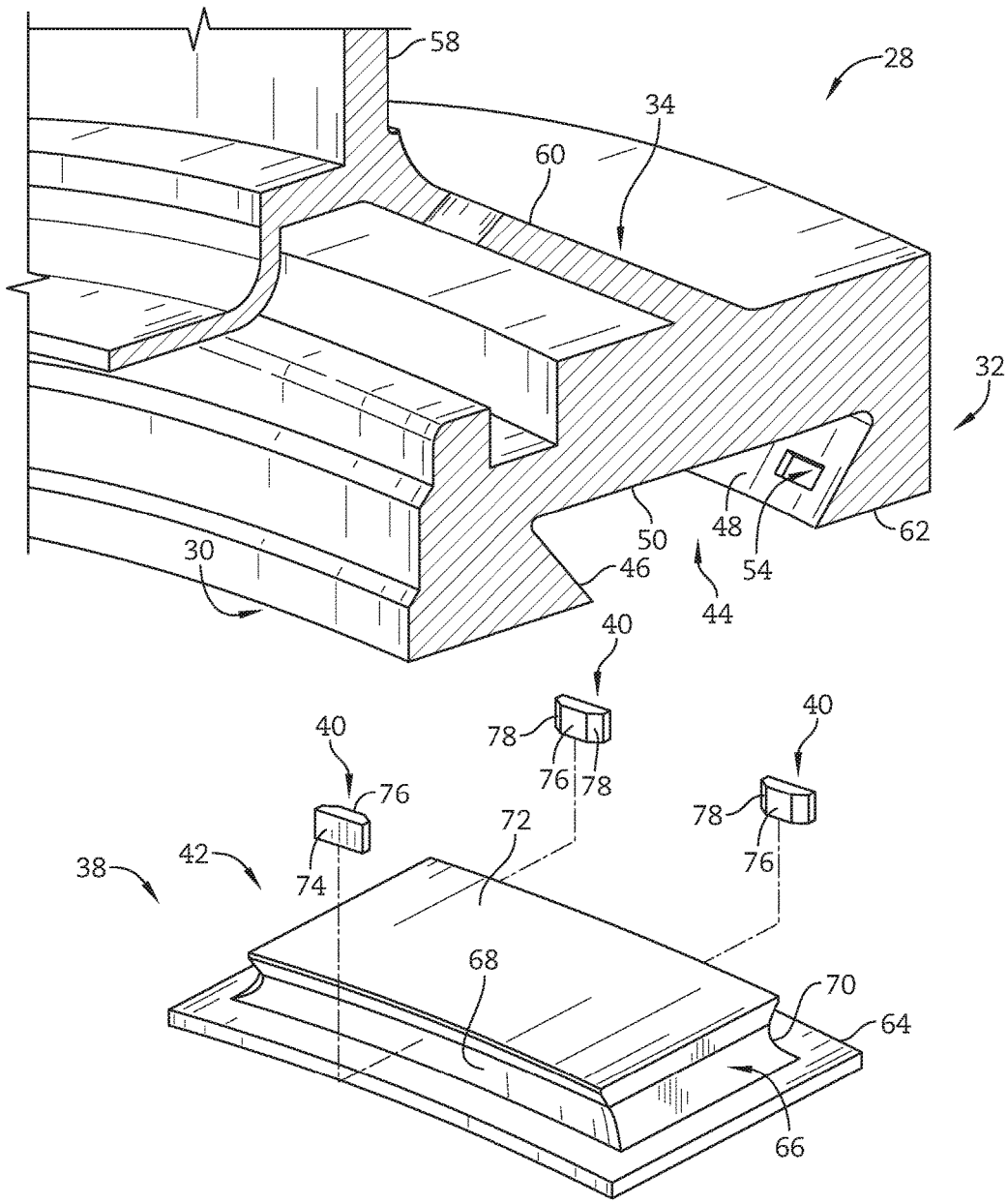
FIG. 3 is a detail perspective view of the turbine shroud of FIG. 2 showing the carrier and one of the blade track segments included in the segmented blade track and further showing that the turbine shroud includes a plurality of load pads adapted to be positioned between the carrier and the blade track segment to transmit loads between the carrier and the blade track segment at predetermined locations while allowing growth of the carrier and the blade track segment at different rates.

For the purposes of promoting an understanding of the principles of the disclosure, reference will now be made to a number of illustrative embodiments illustrated in the drawings and specific language will be used to describe the same.

An illustrative aerospace gas turbine engine 10 for use in an aircraft is cut-away to show that the engine 10 includes an output shaft 12, a compressor 14, a combustor 16, and a turbine 18 as shown in FIG. 1. The output shaft 12 is connected to a fan assembly or propeller configured to push air and propel the aircraft. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 and the turbine 18 extracts work to drive the compressor 14 and the output shaft 12.

The turbine 18 illustratively includes static turbine vane assemblies 21, 23, etc. and corresponding turbine wheel assemblies 25 etc. as shown in FIG. 2. Each vane assembly 21, 23, etc. includes a plurality of corresponding vanes 22, 24, etc. and each turbine wheel assembly 25 etc. includes a plurality of corresponding blades 26 etc. The vanes 22, 24, etc. of the vane assemblies 21, 23, etc. extend across the flow path of the hot, high-pressure combustion products from the combustor 16 to direct the combustion products toward the blades 26 etc. of the turbine wheel assemblies 25 etc. The blades 26 etc. are, in turn, pushed by the combustion products to cause the turbine wheel assemblies 25 etc. to rotate; thereby, driving the rotating components of the compressor 14 and the output shaft 12.

The turbine 18 also includes a plurality of turbine shrouds 28 etc. that include a central axis 20 and the turbine shrouds 28 extend circumferentially about the central axis 20 as shown in FIGS. 1 and 2. The turbine shrouds 28 extend around each turbine wheel assembly 25 etc. to block combustion products from passing over the blades 26 without pushing the blades 26 to rotate. An exemplary first stage turbine shroud 28, shown in FIG. 2, extends around a first stage turbine wheel assembly 25 and is sized to block most combustion products from passing over the blades 26 without pushing the blades 26 to rotate. Combustion products that are allowed to pass over the blades 26 do not push the blades 26 and such passed-over products contribute to lost performance within the engine 10.

The turbine shroud 28 illustratively includes a carrier 34, a blade track (sometimes called seal ring) 38, and a plurality of load pads 40 as shown in FIGS. 2-5. Illustratively, the carrier 34 is an annular, round metallic component configured to support the blade track 38 in position adjacent the blades 26 of the turbine wheel assembly 25. The blade track 38 is coupled with the carrier 34 and extends radially inwardly toward the blades 26 to reduce the size of a circumferential gap 36 formed between the blades 26 and the turbine shroud 28. More combustion products are blocked from passing over the blades 26 through the gap 36 because the size of the circumferential gap 36 between the blades 26 and the turbine shroud 28 is reduced by the blade track 38.

During operation, the blade track 38 may grow at different rates relative to the carrier 34 due to the materials, stresses, and temperatures of the components. When the blade track 38 and the carrier 34 grow relative to each other, they may experience an increase in stresses. Some of the stresses may be applied in low-strength or otherwise undesirable areas of the turbine shroud 28. The plurality of load pads 40 are positioned between portions of the carrier 34 and the blade track 38 to transmit loads between the carrier 34 and the blade track 38 at predetermined locations such as, for example, high-strength areas while allowing growth of the carrier 34 and the blade track 38 at different rates during operation of the gas turbine engine 10 as shown in FIGS. 3 and 5.

Figure 4:
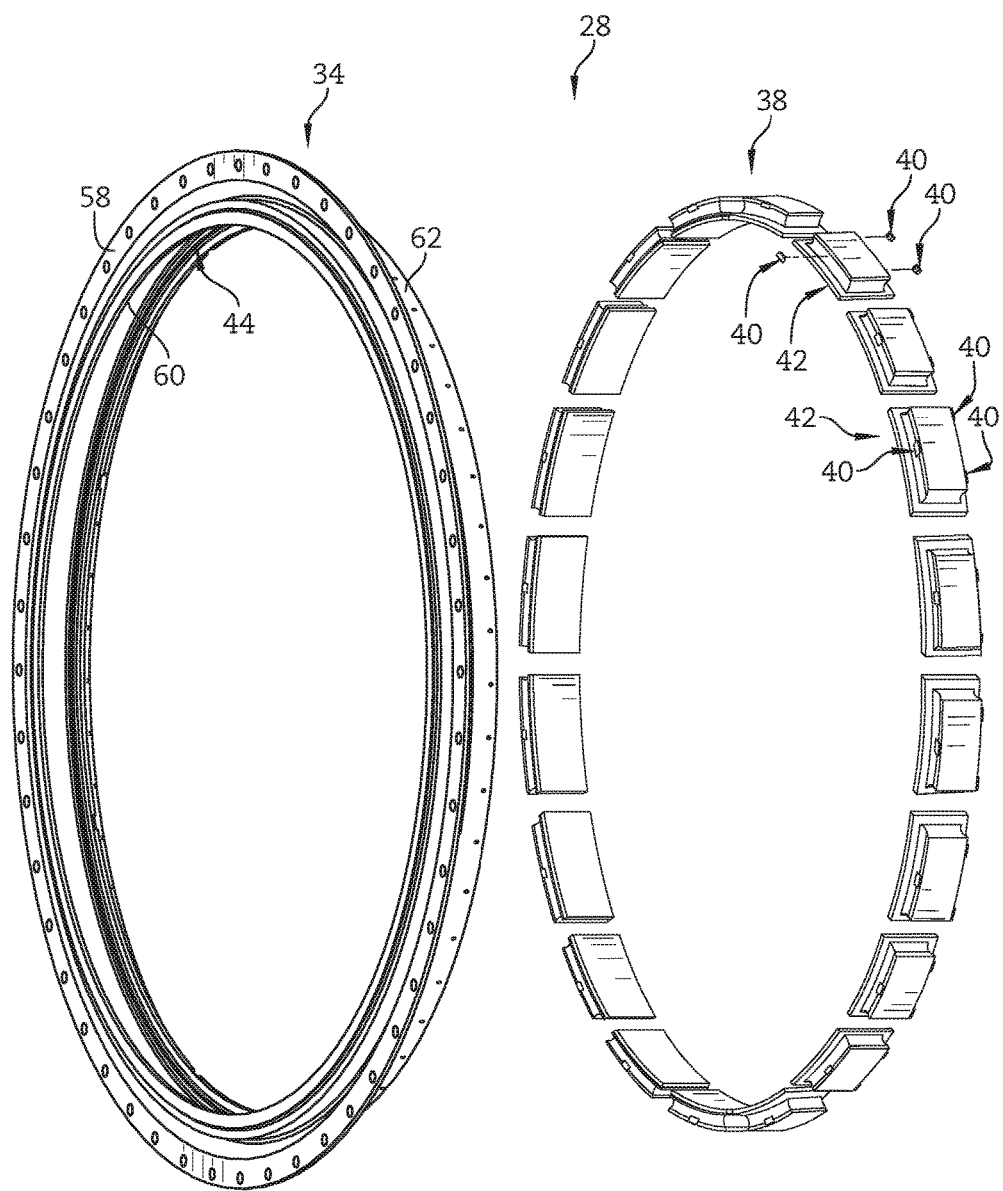
FIG. 4 is an exploded perspective view of the turbine shroud included in the gas turbine engine of FIGS. 1 and 2 showing that the turbine shroud includes the carrier adapted to receive the blade track segments, a plurality of blade track segments that cooperate to form a full hoop blade track around the rotating wheel assembly, and the plurality of load pads adapted to transmit loads between the carrier and the blade track segments.

The illustrative blade track 38 includes a plurality of ceramic containing blade track segments 42 which are nested into the carrier 34 around the central axis 20 as shown in FIG. 4. In other embodiments, the blade track 38 may be an annular component. The turbine shroud 28 may further include a retainer that engages the blade track 38 to position the blade track 38 relative to other static turbine components.

Figure 5:
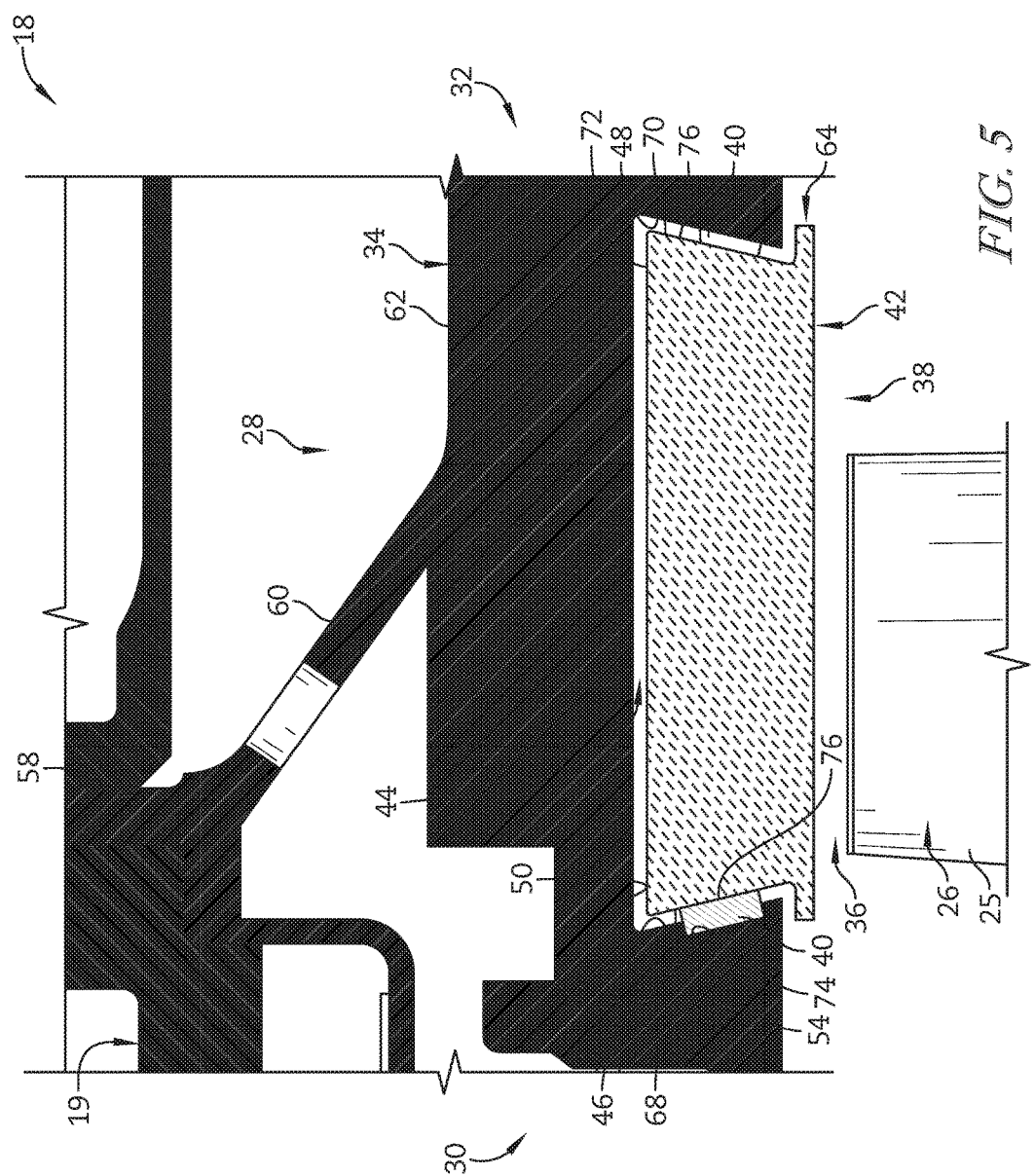
FIG. 5 is a partial cross-sectional view of the gas turbine engine of FIG. 1 showing a blade track segment positioned in a blade track channel formed in the carrier and the load pads positioned in the blade track channel between the blade track segment and the carrier to couple the blade track segment with the carrier and to transmit loads between the carrier and the blade track segment at predetermined locations.

The carrier 34 couples the turbine shroud 28 to a case 19 of the gas turbine engine 10 as shown in FIG. 5. The carrier 34 may be an annular (full-hoop) component, as shown in FIG. 4, or it may be made up of a number of segments. The carrier 34 is formed to include a radially-inwardly opening blade track channel 44 as shown in FIG. 3. The blade track segments 42 are received in the blade track channel 44 to couple the blade track segments 42 with the carrier 34.

In the illustrative embodiment, the blade track segments 42 are received in the blade track channel 44 and interlock with the carrier 34 as shown in FIG. 5. The blade track channel 44 is formed to receive the blade track segments 42 when the blade track segments 42 are moved in a first direction relative to the carrier 34 and to block the blade track segments 42 from moving out of the blade track channel 44 in a second direction. To install the blade track segments 42, the illustrative blade track segments 42 are aligned circumferentially with the blade track channel 44 and are then moved in a circumferential direction relative to the carrier 34 and received in the blade track channel 44. When the blade track segments 42 are positioned in the blade track channel 44, the blade track segments 42 are blocked from radial movement out of the blade track channel 44 by the carrier 34.

The load pads 40 are positioned in the blade track channel 44 between the carrier 34 and the blade track segments 42 as shown in FIG. 5. The load pads 40 engage both the carrier 34 and the blade track segments 42 to transmit and distribute loads between the carrier 34 and the blade track segments 42. Each load pad 40 transmits loads between the carrier 34 and the blade track segments 42 at a fixed location during at least one operating point of the engine 10. The illustrative load pads 40 transmit loads between the carrier 34 and the blade track segments 42 at fixed locations during all operating points of the engine 10.

During operation of the engine 10, the carrier 34 and the blade track segments 42 are heated by the combustion products in the turbine 18. The heated carrier 34 and blade track segments 42 may experience different thermal growth which, without load pads 40, could cause the carrier 34 and blade track segments 42 to load at different points depending on the operating point of the engine 10. As one example, if the carrier 34 and the blade track segment 42 include complementary curves that are well matched at a first temperature, a change in temperature may cause one curve to flatten relative to the other curve. Such a change may lead to more concentrated loading, or even point loading, as the relative geometry changes.

In such a situation, the carrier 34 and blade track segments 42 would load at three discrete points. The three discrete points may change locations for different operating points of the engine 10. As such, blade track segments without load pads 40 may need to be designed to withstand loads in a number of locations which may increase the cost and/or weight of the blade track segments. Those blade track segments may wear faster, resulting in increased maintenance time and costs.

The load pads 40 are included in the turbine shroud 28 to block relative movement between the blade track segments 42 and the carrier 34 during operation of the engine 10. As such, each loads pad 40 transmits loads between the carrier 34 and the blade track segments 42 at a fixed location for a plurality of operating points of the engine 10. In the illustrative embodiment, each load pad 40 transmits loads at the fixed location between the carrier 34 and the blade track segments 42 for all operating points of the engine 10.

The location of the load pads 40 may be selected based on design parameters to locate force loads at fixed locations that are also predetermined locations of the blade track segments 42 and carrier 34 that are suited for the force loads. As a result, the blade track segments 42 may be more reliable, last longer, cost less to produce, and/or weigh less. As an example, the load pads 40 may be positioned to locate loads in high-strength areas and/or away from low-strength areas of the blade track segments 42 and the carrier 34. The load pads 40 may locate loads away from edges and/or corners of the blade track segments 42 and the carrier 34. The load pads 40 may be positioned to locate the mechanical loads in a different region than thermal loads acting on the blade track segments 42 and the carrier 34. In some embodiments, the load pads 40 may be positioned to locate the peak mechanical loads in a different region than peak thermal loads acting on the blade track segments 42 and the carrier 34.

In the illustrative embodiment, the carrier 34 includes a connection flange 58, a connector 60, and a support band 62 as shown in FIG. 5. The connection flange 58 is coupled with the case 19 of the gas turbine engine 10. The connector 60 extends inwardly in the radial direction and rearwardly in an axial direction from the connection flange 58 to form a frustoconical shape. The support band 62 extends inwardly in the radial direction from the connector 60 and the connection flange 58.

The support band 62 is formed to include the blade track channel 44 as shown in FIGS. 3 and 5. The support band 62 includes a fore-retainer surface 46, an aft-retainer surface 48, and an intermediate surface 50 that cooperate to define the blade track channel 44. The fore-retainer surface 46 is located toward a fore end 30 of the turbine shroud 28. The aft-retainer surface 48 spaced apart axially from the fore-retainer surface 46 toward an aft end 32 of the turbine shroud 28. The intermediate surface 50 extends between the fore and aft-retainer surfaces 46, 48 as shown in FIG. 5.

The fore-retainer surface 46 is arranged to support a portion of the blade track segment 42 as shown in FIGS. 3 and 5. In the illustrative embodiment, the fore-retainer surface 46 extends radially outward and into the carrier 34 and axially away from the aft end 32 and toward the fore end 30 of the turbine shroud 28 to form a portion of a dovetail shaped blade track channel 44. The fore-retainer surface 46 extends circumferentially about the central axis 20. In other embodiments, the fore-retainer surface 46 may extend axially without a radial direction component.

In the illustrative embodiment, the fore-retainer surface 46 is formed to include a pad recess 54 as shown in FIG. 5. The pad recess 54 is formed to receive a portion of a load pad 40 to locate the load pad 40 relative to the carrier 34. Illustratively, the pad recess 54 locates the load pad 40 relative to the carrier 34 and the blade track segment 42. The illustrative pad recess 54 extends into the fore-retainer surface 46 toward the fore end 30.

The pad recess 54 may be formed to cause a load pad 40 to engage the blade track segment 42 at a fixed and predetermined location on the blade track segment 42 for example. In the illustratively embodiment, a load pad 40 is positioned in the pad recesses 54 and coupled to the carrier 34 with an adhesive. A plurality of pad recesses 54 may be formed in the carrier 34 to locate the load pads 40 relative to each other. The pad recess 54 formed in the fore-retainer surface 46 is illustratively formed to locate a load pad 40 at about a midpoint of a blade track segment 42 as shown in FIG. 3. In other embodiments, the pad recesses 54 are omitted and the load pads 40 engage the carrier 34 and blade track segments 42 at predetermined locations without using pad recesses 54.

The aft-retainer surface 48 is arranged to support a portion of the blade track segment 42 as shown in FIGS. 3 and 5. In the illustrative embodiment, the aft-retainer surface 48 extends radially outward and into the carrier 34 and axially away from the fore end 30 and toward the aft end 32 of the turbine shroud 28 to form a portion of the dovetail shaped blade track channel 44. The aft-retainer surface 48 extends circumferentially about the central axis 20. In other embodiments, the aft-retainer surface 48 may extend axially without a radial direction component.

In the illustrative embodiment, the aft-retainer surface 48 is formed to include a plurality of pad recesses 54 as shown in FIG. 5. In the illustrative embodiment, the aft-retainer surface 48 is formed to include two pad recesses 54. The pad recesses 54 are each formed to receive a portion of a load pad 40 to locate the load pad 40 relative to the carrier 34. Illustratively, the pad recesses 54 locate the load pads 40 relative to the carrier 34 and the blade track segment 42. The illustrative pad recesses 54 extend into the aft-retainer surface 48 toward the aft end 32.

The pad recesses 54 may be formed to cause load pads 40 to engage the blade track segment 42 at fixed and predetermined locations on the blade track segment 42 for example. In the illustratively embodiment, the load pads 40 are positioned in the pad recesses 54 and coupled to the carrier 34 with an adhesive. A first pad recess 54 is illustratively formed in the aft-retainer surface 48 to locate a load pad 40 toward a first end of a blade track segment 42. A second pad recess 54 is illustratively formed in the aft-retainer surface 48 to locate a load pad 40 toward a second end of a blade track segment 42 spaced apart circumferentially from the first pad recess 54 as shown in FIG. 3. The pad recess 54 formed in the fore-retainer surface 46 is located circumferentially about midway between the pad recesses 54 formed in the aft-retainer surface 48.

The intermediate surface 50 extends axially between the fore-retainer surface 46 and aft-retainer surface 48 as shown in FIGS. 3 and 5. The intermediate surface 50 extends circumferentially about the central axis 20. Illustratively, the intermediate surface 50 cooperates with the fore-retainer surface 46 and the aft-retainer surface 48 to form the dovetail shaped blade track channel 44. In some embodiments, a passage may be formed in the support band 62 that extends through the support band 62 and has an opening in the intermediate surface 50 to provide fluid into the blade track channel 44.

Each blade track segment 42 includes a runner 64 and an attachment body 66 extending radially outward away from the runner 64 as shown in FIGS. 3 and 5. The runner 64 is positioned around the blades 26 to block gasses from flowing over the blades 26 through the circumferentially gap 36. The attachment body 66 is configured to be positioned in the blade track channel 44 to couple the blade track segment 42 with the carrier 34. Illustratively, the attachment body 66 is dovetail shaped and the carrier 34 is configured to block the attachment body 66 from escaping the blade track channel 44 in a radial direction.

The attachment body 66 includes a fore-attachment surface 68, an aft-attachment surface 70, and an outer surface 72 as shown in FIGS. 3 and 5. The fore-attachment surface 68 faces the fore-retainer surface 46. The aft-attachment surface 70 faces the aft-retainer surface 48. The outer surface 72 faces the intermediate surface 50 included in the carrier 34.

The fore-attachment surface 68 is configured to be supported by the fore-retainer surface 46 so that the fore-attachment surface 68 is blocked from escaping the blade track channel 44 as shown in FIG. 5. In the illustrative embodiment, the fore-attachment surface 68 extends radially outward away from the runner 64. The fore-attachment surface 68 illustratively forms a portion of a dovetail shaped attachment body 66. The fore-attachment surface 68 is engaged by a load pad 40 positioned in the pad recess 54 formed in the fore-retainer surface 46.

The aft-attachment surface 70 is configured to be supported by the aft-retainer surface 48 so that the aft-attachment surface 70 is blocked from escaping the blade track channel 44 as shown in FIG. 5. In the illustrative embodiment, the aft-attachment surface 70 extends radially outward away from the runner 64. The aft-attachment surface 70 illustratively forms a portion of a dovetail shaped attachment body 66. The aft-attachment surface 70 is engaged by load pads 40 positioned in pad recesses 54 formed in the aft-retainer surface 48.

The outer surface 72 extends axially between fore-attachment surface 68 and aft-attachment surface 70. In the illustrative embodiment, the outer surface 72 is generally continuous.

The blade track segments 42 are illustratively made from a ceramic material; and, more particularly, a ceramic matrix composite (CMC) including silicon carbide reinforcements and silicon carbide matrix. For purposes of this application, a ceramic material is any monolithic ceramic or composite in which at least one constituent is a ceramic. In other embodiments, each blade track segment 42 may be made from monolithic silicon carbide, dense chopped fiber reinforced silicon carbide, monolithic silicon nitride based materials, monolithic aluminum oxide, whisker reinforced aluminum oxide, and/or MAX phase materials (e.g. $Ti_3SIC_2$, $Ti_2AlC$, etc.).

In some embodiments, the blade track segments 42 may comprise silicon-carbide reinforcements suspended in a silicon-carbide containing matrix material. In other embodiments, the blade track segments 42 may comprise oxide-oxide reinforcements suspended in an oxide-oxide containing matrix material. In still other embodiments, each blade track segment 42 may be made of other metallic, non-metallic, or composite materials with low coefficients of thermal expansion that are compatible with the carrier 34.

The load pads 40 are adapted to transmit loads between the carrier 34 and the blade track segments 42 at predetermined locations while allowing growth of the carrier 34 and the blade track segments 42 at different rates during use of the turbine shroud 28. The load pads 40 are illustratively sacrificial (consumable through wear and/or abrasion) components, for example, so as to not wear away the components in contact with the load pads 40. The load pads 40 may have various shapes, sizes, thickness, compliance, etc. and can vary in relative placement around the blade track segment 42.

Each load pad 40 may have a varying thickness, for example, to compensate for variations in component fabrication while allowing fluid to pass around the bearing points for cooling. Load pads 40 having varying thickness may also allow a gap size between the carrier 34 and the blade track segment 42 to be controlled. Using individual load pads 40 may allow for each load pad 40 to be positioned independently of other load pads 40.

Each load pad 40 may comprise various materials. Each load pad 40 may comprise one or more of a metallic, a composite, or a monolithic ceramic material. In some embodiments, the load pads 40 comprise cobalt. The load pads 40 may comprise a cobalt based, nickel based, or cobalt nickel based alloy. The load pads 40 may be aluminized before or after they are positioned in the blade track channel 44. In embodiments where the load pads 40 are aluminized after they are positioned in the blade track channel 44, the load pads 40 first may be brazed to the carrier 34. In some embodiments, the load pads 40 comprise wire mesh. In other embodiments, the load pads 40 comprise mica board or another similar material. In some embodiments, the load pads comprise a high-temperature gasket material.

In the illustrative embodiment, the load pads 40 are used with a dovetail configuration in the turbine shroud 28. Illustratively the load pads 40 are used with a turbine shroud. In other embodiments, the load pads 40 may be used in the compressor 14, combustor 16, output shaft 12, the turbine 18, and any other engine component. For example, load pads 40 may be used to locate ceramic combustor tiles relative to a metallic support shell in a combustor assembly.

Each load pad 40 includes an outer pad surface 74 arranged to engage the carrier 34, an inner pad surface 76 spaced apart from the outer pad surface 74 and arranged to engage the blade track segment 42, and at least first and second ramped surfaces 78 as shown in FIG. 3. The first ramped surface 78 extends away from the inner pad surface 76 at an angle relative to the inner pad surface 76 toward the outer pad surface 74. The second ramped surface 78 extends away from another side of the inner pad surface 76 at an angle relative to the inner pad surface 76 toward the outer pad surface 74.

The ramped surfaces 78 are adapted to engage the blade track segment 42 during assembly of the turbine shroud 28. The ramped surfaces 78 provide an inclined surface and reduce the chances of the blade track segment 42 abutting a steep surface that could block movement of the blade track segment 42 during assembly. As a result, the ramped surfaces 78 guide the blade track segment 42 into position so that the inner pad surfaces 76 of the load pads 40 engage the blade track segment 42.

The load pads 40 are positioned in the blade track channel 44 between the carrier 34 and the blade track segment 42 as shown in FIG. 5. Illustratively, a single load pad 40 is positioned in the blade track channel 44 between the fore-retainer surface 46 of the carrier 34 and the fore-attachment surface 68 of the blade track segment 42. A pair of load pads 40 is positioned in the blade track channel 44 between the aft-retainer surface 48 of the carrier 34 and the aft-attachment surface 70 of the blade track segment 42. In the illustrative embodiment, for each blade track segment 42, one load pad 40 is positioned in the fore end 30 of the blade track channel 44 while two load pads 40 are positioned in the aft end 32 due to a lower delta pressure at the fore end 30 of the blade track 38 and a higher delta pressure at the aft end 32 of the blade track 38.

In some embodiments, the load pads 40 are integral with one of the carrier 34 and blade track 38. For example, the load pads 40 and carrier 34 may be monolithic and the load pads 40 extend radially inwardly from the fore and aft-retainer surfaces 46, 48. In the illustrative embodiment, the fore-attachment surface 68 is spaced apart from the fore-retainer surface 46. The aft-attachment surface 70 is spaced apart from the aft-retainer surface 48. The load pads 40 support the surfaces 46, 48, 68, 70 to maintain the surfaces 46, 48, 68, 70 in spaced apart relation. In the illustrative embodiment, the surfaces 46, 48, 68, 70 are spaced apart to form gaps therebetween. The gaps may receive seals such as, for example, rope seals and/or cooling fluid.

According to at least one method of assembling the turbine shroud 28, a first load pad 40 is positioned in the first pad recess 54 formed in the aft-retainer surface 48 of the carrier 34. A second load pad 40 is positioned in the second pad recess 54 formed in the aft-retainer surface 48 of the carrier 34. A third load pad 40 is positioned in the pad recess 54 formed in the fore-retainer surface 46 of the carrier 34. The outer pad surfaces 74 of the load pads 40 are coupled to the carrier 34 with adhesive to block movement of the load pads 40 during assembly of the blade track segment 42 with the carrier 34. In some embodiments, the outer pad surfaces 74 are brazed to the carrier 34.

The attachment body 66 of the blade track segment 42 is aligned circumferentially with the blade track channel 44. The blade track segment 42 is moved circumferentially relative to the carrier 34 so that the attachment body 66 is received in the blade track channel 44 and the runner 64 is positioned between the carrier 34 and the central axis 20.

The blade track segment 42 is moved circumferentially relative to the carrier 34 further into the blade track channel 44. As the blade track segment 42 is moving, the ramped surfaces 78 of the load pads 40 may engage the blade track segment 42 and guide the blade track segment 42 so that blade track segment 42 is moved to the desired position. The blade track segment 42 is moved into the blade track channel 44 until the three load pads 40 engage the attachment surfaces 68, 70 at the desired position. As a result, loads are transmitted through the load pads 40 between the carrier 34 and the blade track segment 42 in the predetermined positions during operation of the engine 10. Similarly, additional load pads 40 and blade track segments 42 may be assembled with the carrier 34.

During operation, the adhesive that couples the load pads 40 with the carrier 34 may be consumed. The load pads 40 are configured to remain in their predetermined locations if the adhesive is consumed.

The characteristics of the load pads 40 such as, for example, size, material, and compliance may be chosen for individual load pads 40. As an example, a portion of the first mating component such as, for example, the blade track channel 44 may be measured. A portion of the second component, such as, for example, the attachment body 66 and, in particular, the fore-attachment surface 68, the aft-attachment surface 70, and the outer surface 72 may be measured. The difference between the measurements of the first component and the second component may be determined. A size or thickness of each individual load pad 40 may then be determined based on the difference between the measurements.

Figure 6:
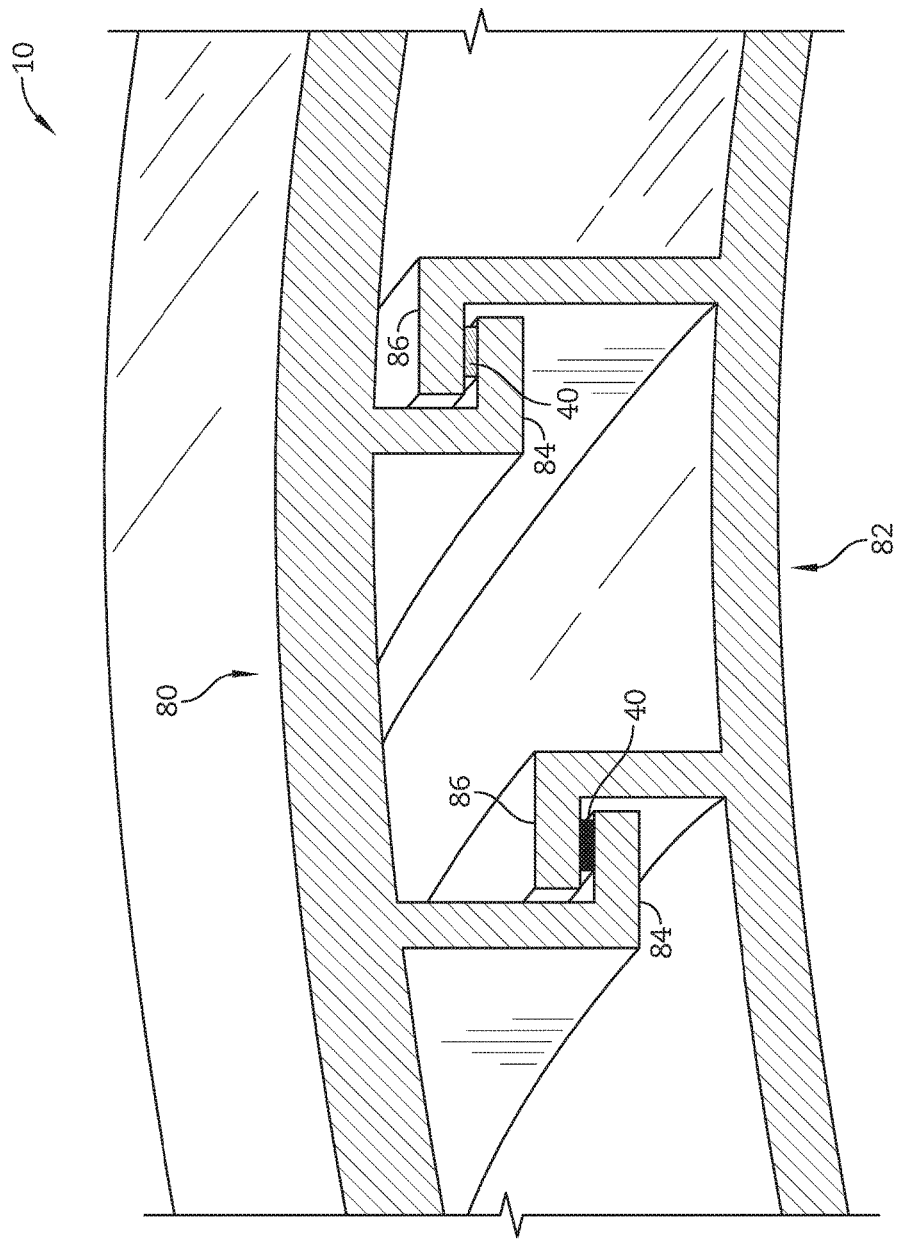
FIG. 6 is detail perspective view of another assembly adapted for use in the gas turbine engine of FIG. 1 showing that the assembly includes a first component, a second component adapted to couple with the first component, and a plurality of load pads positioned between the first and second components to couple the first component with the second component and to transmit loads between the first and second components at predetermined locations while allowing growth of the components at different rates.

Another illustrative example of the load pads 40 being used with another coupling configuration is shown in FIG. 6. A first engine component 80 extending around and coupled with a second engine component 82 is shown in FIG. 6. The first engine component 80 includes radially inwardly extending hangers 84. The second engine component 82 includes radially outwardly extending hangers 86.

The radially inwardly extending hangers 84 and the radially outwardly extending hangers 86 extend circumferentially at least partway around the central axis 20. The radially inwardly extending hangers 84 are arranged to interlock with and support the radially outwardly extending hangers 86. A plurality of load pads 40 are positioned between the hangers 84, 86 to transmit loads between the hangers 84, 86 at predetermined and fixed locations while allowing growth of the components at different rates during use of the engine 10. Illustratively the load pads 40 are coupled with the hangers 84, 86 by an adhesive. In some embodiments, the hangers 84, 86 may include pad recesses formed to receive a portion of the load pads 40.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud comprising
   a metallic carrier arranged around a central axis, the metallic carrier formed to include a radially-inwardly opening blade track channel defined by a fore-retainer surface, an aft-retainer surface spaced apart axially from the fore-retainer surface, and an intermediate surface extending between the fore and aft-retainer surfaces,
   a ceramic blade track segment including a runner and an attachment body extending radially outward away from the runner and positioned in the blade track channel to couple the ceramic blade track segment with the metallic carrier, the attachment body including a fore-attachment surface that faces the fore-retainer surface, an aft-attachment surface that faces the aft-retainer surface, and an outer surface that faces the intermediate surface, and
   a plurality of load pads positioned in the blade track channel radially inward of the outer surface included in the attachment body between the fore-retainer surface and the fore-attachment surface and between the aft-retainer surface and the aft-attachment surface to transmit loads between the metallic carrier and the ceramic blade track segment at predetermined locations on the fore and aft-attachment surfaces while allowing growth of the metallic carrier and the ceramic blade track segment at different rates during use of the turbine shroud,
   wherein each load pad includes an outer pad surface arranged to engage the metallic carrier, an inner pad surface spaced apart from the outer pad surface and arranged to engage the ceramic blade track segment, and at least two ramped surfaces that each extend away from the inner pad surface at an angle relative to the inner pad surface toward the outer pad surface.

2. A turbine shroud comprising
   a metallic carrier arranged around a central axis, the metallic carrier formed to include a radially-inwardly opening blade track channel defined by a fore-retainer surface, an aft-retainer surface spaced apart axially from the fore-retainer surface, and an intermediate surface extending between the fore and aft-retainer surfaces,
   a ceramic blade track segment including a runner and an attachment body extending radially outward away from the runner and positioned in the blade track channel to couple the ceramic blade track segment with the metallic carrier, the attachment body including a fore-attachment surface that faces the fore-retainer surface, an aft-attachment surface that faces the aft-retainer surface, and an outer surface that faces the intermediate surface, and
   a plurality of load pads positioned in the blade track channel radially inward of the outer surface included in the attachment body between the fore-retainer surface and the fore-attachment surface and between the aft-retainer surface and the aft-attachment surface to transmit loads between the metallic carrier and the ceramic blade track segment at predetermined locations on the fore and aft-attachment surfaces while allowing growth of the metallic carrier and the ceramic blade track segment at different rates during use of the turbine shroud, wherein the fore-retainer surface or the aft-retainer surface of the metallic carrier is formed to include a pad recess that extends into one of the fore-retainer surface or the aft-retainer surface, and the pad recess receives a portion of a load pad of the plurality of load pads.

3. The turbine shroud of claim 2, wherein the pad recess extends into the fore-retainer surface, and wherein the fore-attachment surface is spaced apart from the fore-retainer surface and the load pad received in the pad recess extends beyond the pad recess into the blade track channel and engages the fore-attachment surface.

4. The turbine shroud of claim 2, wherein the pad recess extends into the aft-retainer surface, and wherein one of the plurality of load pads includes an outer pad surface positioned in the pad recess and engaged with the aft-retainer surface and an inner pad surface spaced apart from the outer pad surface and positioned in the blade track channel and engaged with the aft-attachment surface.

5. The turbine shroud of claim 2, wherein the aft-retainer surface is formed to include a first pad recess and a second pad recess spaced apart circumferentially from the first pad recess and the fore-retainer surface is formed to include a third pad recess located circumferentially about midway between the first and second pad recesses.

6. The turbine shroud of claim 5, wherein a load pad of the plurality of load pads is positioned in each of the first, second, and third pad recesses and each load pad is coupled with the metallic carrier by an adhesive to block the load pads from moving out of the first, second, and third pad recesses.

7. The turbine shroud of claim 2, wherein the predetermined locations on the fore and aft-attachment surfaces are high strength areas of the ceramic blade track segment positioned away from an edge of the ceramic blade track segment.

8. The turbine shroud of claim 2, wherein the plurality of load pads are positioned in the predetermined locations on the fore and aft-attachment surfaces to locate peak mechanical loads in a different region than peak thermal loads acting on the ceramic blade track segment.

9. The turbine shroud of claim 2, wherein the fore-attachment surface is spaced apart from the fore-retainer surface and the aft-attachment surface is spaced apart from the aft-retainer surface.

10. The turbine shroud of claim 2, wherein the plurality of load pads comprise a nickel alloy.

11. A method of assembling a turbine shroud for use in an engine, the method comprising positioning load pads along a sidewall included in a blade track channel of a metallic carrier, moving an attachment body of a ceramic blade track segment relative to the metallic carrier and into the blade track channel to cause the load pads to engage the attachment body and transmit loads between the metallic carrier and the ceramic blade track segment through predetermined locations on the attachment body while allowing growth of the metallic carrier and the ceramic blade track segment at different rates during engine operation, and wherein the load pads include an outer pad surface engaged with the metallic carrier, an inner pad surface spaced apart from the outer pad surface and arranged to engage the ceramic blade track segment, and at least two ramped surfaces extending away from the inner pad surface toward the outer pad surface and the inner pad surface.

12. The method of claim 11, further comprising coupling the outer pad surface to the metallic carrier with an adhesive.

13. A method of assembling a turbine shroud for use in an engine, the method comprising positioning load pads along a sidewall included in a blade track channel of a metallic carrier, moving an attachment body of a ceramic blade track segment relative to the metallic carrier and into the blade track channel to cause the load pads to engage the attachment body and transmit loads between the metallic carrier and the ceramic blade track segment through predetermined locations on the attachment body while allowing growth of the metallic carrier and the ceramic blade track segment at different rates during engine operation, and wherein the metallic carrier includes a radially extending fore-retainer sidewall and a radially extending aft-retainer sidewall that is spaced apart axially from the fore-retainer sidewall, the aft-retainer sidewall is formed to include a first pad recess and a second pad recess spaced apart circumferentially from the first pad recess and the fore-retainer sidewall is formed to include a third pad recess located circumferentially about midway between the first and second pad recesses.

14. The method of claim 13, further including moving the attachment body of the ceramic blade track segment relative to the metallic carrier and out of the blade track channel and disposing of the load pads.

* * * * *